UNITED STATES PATENT OFFICE.

JOHN HARVEY KELLOGG, OF BATTLE CREEK, MICHIGAN.

FOOD COMPOUND.

1,001,044. Specification of Letters Patent. Patented Aug. 22, 1911.

No Drawing. Application filed October 19, 1908. Serial No. 458,551.

*To all whom it may concern:*

Be it known that I, JOHN HARVEY KELLOGG, a citizen of the United States, residing at Battle Creek, county of Calhoun, State of Michigan, have invented certain new and useful Improvements in Food Compounds, of which the following is a specification.

This invention relates to improvements in food products.

The main object of this invention is to provide an improved food product which is palatable and nourishing and one which is well adapted for use as a meat substitute.

A further object is to provide a food embodying these advantages which can be economically produced.

Still further objects will definitely appear from the detailed description to follow.

The invention is clearly defined and pointed out in the claim.

In the preparation of my improved food product, I use the following ingredients, in about the following proportions: gluten, three pounds; legumes, such as peas, beans, or lentils, 1 pound; oil, one-half pound; one egg to each pound of the foregoing ingredients; yeast products, either in the form of the concentrated extract of yeast, or what I designate as the crude product,—that is, the yeast cells and their contents together,—of the extract, two to four grams to the pound of the other ingredient, and of the crude product, one to two ounces; and salt, if desired. I preferably prepare and combine these ingredients in the following manner: I prepare the gluten preferably from wheat flour, by washing out the starch, the gluten being in its wet condition. The legumes, preferably peas or beans, are prepared by cooking and reducing to a meal or paste, the hulls preferably being removed.

The yeast product is preferably prepared from brewery yeast, which is first diluted with water and washed through a fine sieve to remove the bitter hop resin, which is, for the most part, to be found in particles coarser than yeast. This washed yeast is then put into bags of stout ducking or other suitable filtering fabric, and pressed to extract the water. The moist yeast thus obtained is mixed with from two to five per cent. of salt, under the influence of which the yeast envelops are broken and the soluble matters contained therein are set free, the mass liquefying to the consistency of cream. This may be used in this form in the preparation of my improved food, or, it may be put through a filtering press and the liquid obtained concentrated by any other well known means. It is well known that this extract in flavor very closely resembles that of meat extract, as well as being a substitute therefor in other respects.

There are, of course, a number of processes by which the yeast cells may be ruptured or caused to give up their contents, but the process described is preferred by me, as the product contains no injurious, or objectionable, or undesirable ingredients, for the product in which the extract is used. Before the filtering and concentrating, the product is what I designate herein as the crude product.

The gluten, the legume meal or pulp and the oil and salt are thoroughly mixed by passing the same several times through a shredding machine. When eggs are used, the same are added to the cooked meal before the meal is combined with the gluten. The yeast product is preferably thoroughly mixed with the water before the water is added, as it thereby more effectively penetrates the mixture. It might, of course, be added in the form of the unconcentrated liquid, instead of the water. The water is added before, or during, the mixing process. Either the whites or the yolks alone or both may be used. Fresh eggs may be used, or desiccated eggs may be found satisfactory. This mixture is then placed in cans, sealed and cooked, preferably for about six hours at a temperature of 225 degrees Fahrenheit. The temperature of the cooking and the length of time of cooking can, of course, be greatly varied and a desirable product still be secured. However, I prefer to cook about as I have indicated, as this insures a complete cooking and a complete blending of the materials into a homogeneous mass. I preferably use a vegetable oil, such as corn oil, or nuts, or the oil of nuts, or the like, as I thus secure a food compound entirely of vegetable origin. Suitable animal oils may, however, be used, and a very satisfactory product is obtained by using butter. Some legumes contain sufficient oil so that a satisfactory product may be produced without the addition of other oil. After cooking, the food is ready for serving and may be either served directly from the cans, or may be prepared in a great variety of ways in imitation of different meat dishes. By this treatment, the product is given a meaty consistency, having quite a distinct fiber, and is quite like some meats in flavor, and closely approaches meat in its food elements.

My improved food product is very nourishing and may be used as a meat substitute and is designed by me to be so used, although, of course, its use is optional. If it is desired, my improved food product may be dried after cooking, and reduced to a powder for use in making soups, broths, and similar preparations. In its dried and powdered form, it has the advantage of lightness, and may also be compressed into small bulk.

While I prefer to combine the ingredients in about the proportions specified, I desire to state that they may be considerably varied and a valuable product still be secured, although, of course, such variations will vary more or less the food elements.

My improved food product possesses excellent keeping qualities, and, as before remarked, may be used in a great variety of ways. While the elements may be combined and the product treated very effectively and economically by the process I have described, I am aware that there are numerous other ways of accomplishing substantially the same result.

Having thus described my invention, what I claim as new and desire to secure by Letters Patent is:

An improved food compound comprising gluten, legumes, oil, and yeast products combined and cooked substantially as described and in about the proportions specified into a homogeneous mixture of fibrous consistency and meat-like flavor.

In witness whereof, I have hereunto set my hand and seal in the presence of two witnesses.

JOHN HARVEY KELLOGG. [L. S.]

Witnesses:
E. E. SMITH,
LETHA PETTENGILL.

Copies of this patent may be obtained for five cents each, by addressing the "Commissioner of Patents, Washington, D. C."